J. H. SAGER.
AUTOMOBILE BUFFER BAR.
APPLICATION FILED OCT. 18, 1909.
941,654.
Patented Nov. 30, 1909.
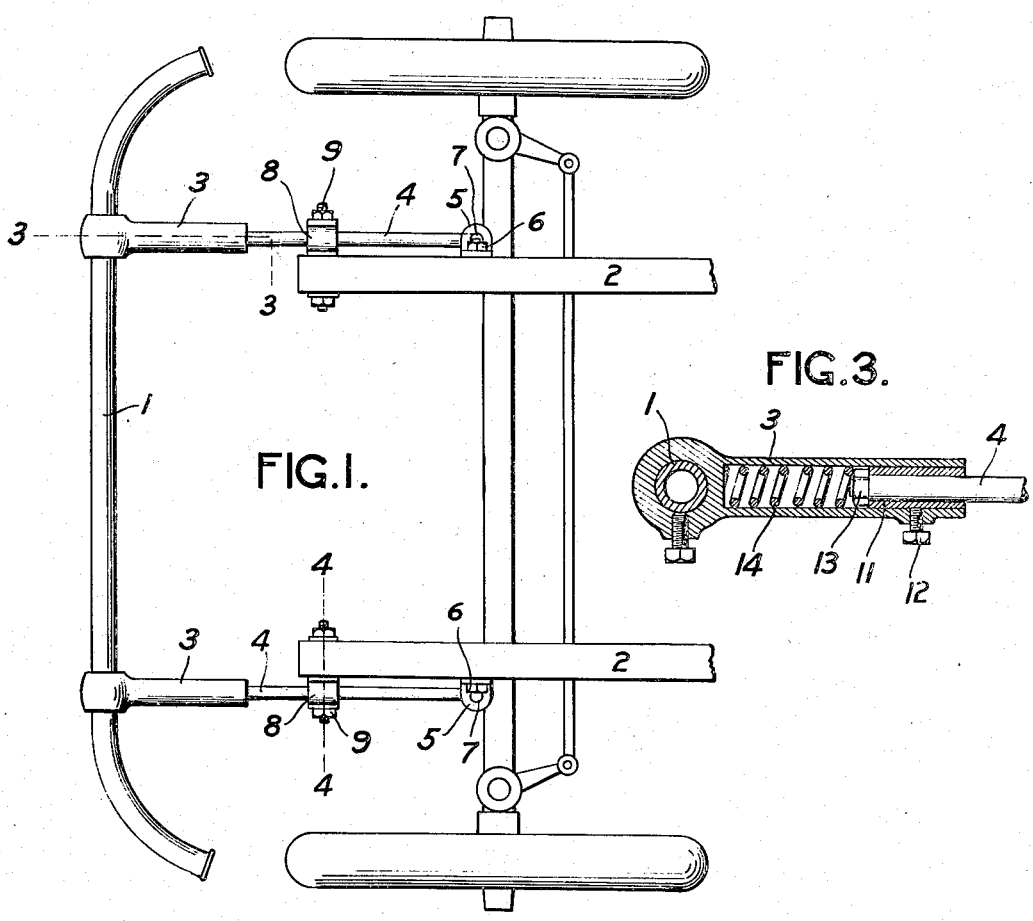
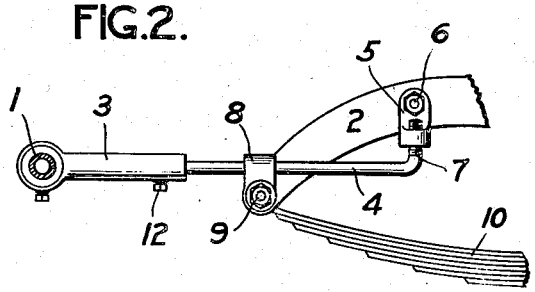
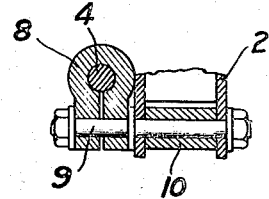
WITNESSES:
C. W. Carroll
D. Gurnee
INVENTOR:
James H. Sager
by Osgood & Davis
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

AUTOMOBILE BUFFER-BAR.

941,654.  Specification of Letters Patent.  Patented Nov. 30, 1909.

Application filed October 18, 1909. Serial No. 523,367.

*To all whom it may concern:*

Be it known that I, JAMES H. SAGER, a citizen of the United States, and resident of Rochester, in the county of Monroe and State of New York, have invented certain new and useful Improvements in Automobile Buffer-Bars, of which the following is a specification.

This invention relates to automobile buffer bars, and the object of the invention is to protect the front end of an automobile or other vehicle from injurious contact with any obstacle which it may strike, and also to cushion the blow in order to reduce the shock to the occupants of the car, and its particular object is a set of buffer bars that is adjustable, without alteration, for automobiles of different lines and dimensions.

In the drawings:—Figure 1 is a top plan view of the front end of an automobile frame with the device in place; Fig. 2 is a side elevation of the same; Fig. 3 is an enlarged cross-section on the line 3—3 of Fig. 1; and Fig. 4 is an enlarged cross-section on the line 4—4 of Fig. 1.

The buffer-bar 1 is a rail that extends transversely to the vehicle-frames 2, 2, and is supported thereon at a suitable height from the ground. The supports in the present embodiment of the invention comprise sleeves 3, 3 that fit over rods 4, 4. The latter are rigidly fastened on the frames 2. One of said fastenings is a bracket 5, adapted to be bolted on the frame at 6, after the upturned end 7 of the rod 4 has been inserted into it. In the drawing the end 7 is represented as screwed into the bracket 5, but may be otherwise secured therein. The other fastening is a clamp 8 (Fig. 4) around the rod 4, through which a stud 9 passes, as well as through one end of the vehicle spring 10 as shown. The brackets 5 and the clamps 8 combine to hold the rods 4 rigid.

The sleeves 3 have bushings 11 (Fig. 3) at their rear ends, that are bored so as to be slidable on the rods 4. The bushings are held immovable with respect to the sleeves by setscrews 12.

The rods 4 are shouldered down at their front ends, and are each capped by a nut 13. Within the hollow center of the sleeve 3, between the nut 13 and bar 1, lies a spring 14. Said spring constantly presses against the nut 13 and the front end of the sleeve, thereby moving the latter forward until the front end of the bushing 11 rests against the rear face of said nut, as shown in Fig. 3.

If the bar 1 encounters an object with a shock, it will be thrust backward, or toward the vehicle, carrying with it the sleeves 3, and so compress the springs 14 against the immovable nuts 13. The sleeves can slide along the rods 4, the limit of their movement depending on the length of the springs. When the vehicle is backed away from the object encountered, the springs throw the sleeves 3 and the bar 1 forward again to their former position.

The great advantage of this construction, besides those of cheapness, strength and simplicity, is that by attaching the supporting bar 4 rigidly to the automobile frame, and providing a buffer that will slide upon it, it becomes possible to turn up the ends of the supporting bar, as shown, and so make them adjustable with respect to the brackets 5, for frames of different lines and dimensions. This means that this invention provides means for bracing the buffer both horizontally and vertically, which are adjustable with respect to each other, and so are adapted to be attached to most any kind of frame.

What I claim is:—

1. In automobile buffer-bars, the combination with a cross-rail to receive the shock, of similar, separated sleeves attached thereto and projecting at right angles therefrom; rods adapted to slide within said sleeves, respectively; springs interposed between said rods and cross-rail; means for attaching said rods to the automobile frame; and means adjustable at right angles to said rods for bracing said rods horizontally and vertically; substantially as shown and described.

2. In automobile buffer-bars, the combination with a cross-rail to receive the shock, of similar, separated sleeves attached thereto and projecting at right angles therefrom; rods adapted to slide within said sleeves, respectively, whose outer ends are turned at right angles; springs interposed between said rods and cross-rail; means for attaching said rods to the automobile frame; and brackets 5, 5, adapted to receive the upturned ends of said rods, respectively, and to be attached to the automobile frame; substantially as shown and described.

JAMES H. SAGER.

Witnesses:
D. GURNEE,
L. THON.